(12) United States Patent
Bhaatia et al.

(10) Patent No.: US 8,574,396 B2
(45) Date of Patent: Nov. 5, 2013

(54) HYDRATION INHIBITOR COATING FOR ADHESIVE BONDS

(75) Inventors: Promila P. Bhaatia, Farmington, CT (US); Joseph Parkos, East Haddam, CT (US)

(73) Assignee: United Technologies Corporation, Hartford, CT (US)

( * ) Notice: Subject to any disclaimer, the term of this patent is extended or adjusted under 35 U.S.C. 154(b) by 80 days.

(21) Appl. No.: 12/870,892

(22) Filed: Aug. 30, 2010

(65) Prior Publication Data

US 2012/0052304 A1    Mar. 1, 2012

(51) Int. Cl.
| | |
|---|---|
| C23C 8/10 | (2006.01) |
| B29C 65/00 | (2006.01) |
| B32B 37/00 | (2006.01) |
| B32B 38/00 | (2006.01) |
| B32B 27/38 | (2006.01) |

(52) U.S. Cl.
USPC ............ 156/330; 148/284; 156/281; 428/414

(58) Field of Classification Search
USPC .................. 148/284; 156/281, 330; 428/414
See application file for complete search history.

(56) References Cited

U.S. PATENT DOCUMENTS

| | | | |
|---|---|---|---|
| 3,808,031 A | 4/1974 | Brill-Edwards | |
| 4,085,012 A * | 4/1978 | Marceau et al. | 205/50 |
| 4,107,004 A | 8/1978 | Ward et al. | |
| 4,171,231 A | 10/1979 | Bishop et al. | |
| 4,308,079 A | 12/1981 | Venables et al. | |
| 4,416,737 A | 11/1983 | Austin et al. | |
| 4,859,289 A | 8/1989 | Nishimura et al. | |
| 5,032,237 A | 7/1991 | Wieserman | |
| 5,188,905 A | 2/1993 | Shindou et al. | |
| 5,246,786 A | 9/1993 | Usui | |
| 5,304,257 A | 4/1994 | Pearlstein | |
| 5,304,401 A | 4/1994 | Shindou et al. | |
| 5,306,526 A | 4/1994 | Gray et al. | |
| 5,308,709 A | 5/1994 | Ogino et al. | |
| 5,330,850 A | 7/1994 | Suzuki et al. | |
| 5,374,347 A | 12/1994 | Pearlstein | |
| 5,595,831 A | 1/1997 | Clark | |
| 5,700,561 A | 12/1997 | Mano et al. | |
| 6,375,726 B1 | 4/2002 | Matzdorf et al. | |
| 6,447,620 B1 | 9/2002 | Komiyama et al. | |
| 6,500,565 B2 | 12/2002 | Usui | |

(Continued)

FOREIGN PATENT DOCUMENTS

| | | |
|---|---|---|
| EP | 0916746 A1 | 5/1999 |
| EP | 1369503 | 12/2003 |

(Continued)

OTHER PUBLICATIONS

EP Search Report for EP11250708 mailed Oct. 18, 2011.

(Continued)

*Primary Examiner* — Michael Orlando
(74) *Attorney, Agent, or Firm* — Carlson, Gaskey & Olds, P.C.

(57) ABSTRACT

A method for adhesively bonding a metallic substrate and a component together includes treating the metallic substrate to form an oxide layer thereon, treating the oxide layer with a conversion coating solution to form a bond promoter coating on the oxide layer, and depositing an adhesive material on the bond promoter coating to bond the component and the metallic substrate together.

12 Claims, 1 Drawing Sheet

(56) References Cited

U.S. PATENT DOCUMENTS

| | | |
|---|---|---|
| 6,527,841 B2 | 3/2003 | Matzdorf et al. |
| 6,631,622 B1 | 10/2003 | Ghent et al. |
| 6,648,986 B1 | 11/2003 | Tang et al. |
| 6,756,134 B2 | 6/2004 | Hodgens et al. |
| 6,869,690 B1 | 3/2005 | Hodgens et al. |
| 7,018,486 B2 | 3/2006 | Bhatia |
| 7,153,348 B2 | 12/2006 | Izaki et al. |
| 7,172,677 B2 | 2/2007 | Thompson et al. |
| 2003/0217787 A1* | 11/2003 | Parkos et al. ................. 148/255 |
| 2005/0178475 A9* | 8/2005 | Bhatia .......................... 148/250 |
| 2008/0151829 A1 | 6/2008 | Khandekar et al. |

FOREIGN PATENT DOCUMENTS

| | | |
|---|---|---|
| EP | 1378585 | 1/2004 |
| GB | 2230974 | 11/1990 |
| JP | 58045396 A | 3/1983 |
| JP | 2018982 A | 1/1990 |
| JP | 5106058 | 4/1993 |
| JP | 6146002 | 5/1994 |
| JP | 8060175 | 3/1996 |
| JP | 8100272 | 4/1996 |
| JP | 8176845 | 7/1996 |
| JP | 10168581 | 6/1998 |
| JP | 11217682 | 8/1999 |
| WO | WO9908806 | 2/1999 |
| WO | WO0032843 | 6/2000 |
| WO | WO0035595 | 6/2000 |
| WO | WO0192595 | 12/2001 |
| WO | WO2008151829 | 12/2008 |

OTHER PUBLICATIONS

Hardwick et al.: "Environmental Durability of Aluminium Adhesive Joints Protected with Hydration Inhibitors", Journal of Materials Science, vol. 19, No. 1, Jan. 1, 1984 pp. 223-232.

Matienzo et al,: "Environmental and Adhesive Durability of Aluminium-Polymer Systems Protected with Organic Corrosion Inhibitors", Journal of Materials Science, vol. 21, No. 5 May 1, 1986, pp. 1601-1608.

Davis et al.: "Use of Hydration Inhibitors to Improve Bond Durability of Aluminium Adhesive Joints", Journal of Materials Science, vol. 20, No. 3, Mar. 1, 1985, pp. 978-988.

Hardwick et al.: "Environmental Durability of Phosphoric Acid Anodized Aluminium Adhesive Joints Protected with Hydration Inhibitors", Journal of Materials Science, vol. 21, No. 1, Jan. 1, 1986, pp. 179-187.

Ahearn et al., Improved Durability of Aluminum Adhesive Bonds with Phosphonic Acid Inhibitors, J. Adhesion, 1989, vol. 28, pp. 75-102.

* cited by examiner

HYDRATION INHIBITOR COATING FOR ADHESIVE BONDS

BACKGROUND

This disclosure relates to adhesively bonded joints. Assembled components, such as aircraft components, may utilize an adhesive material to hold two or more sub-components together. Typically, at least one of the sub-components is metallic. A primer layer may be applied to at least one of the sub-components to help form a strong bond. The primer layer may contain hexavalent chromium to protect the metallic sub-component from corrosion and provide a strong bond.

SUMMARY

An example method for adhesively bonding a metallic substrate and a component together includes treating the metallic substrate to form an oxide layer thereon, treating the oxide layer with a conversion coating solution to form a bond promoter coating on the oxide layer, and depositing an adhesive material on the bond promoter coating to bond the component and the metallic substrate together.

An example method for inhibiting hydration of an adhesive joint in an adhesively bonded article having a metallic substrate, an oxide coating on the metallic substrate, and an adhesive material that joins the metallic substrate and a component, includes resisting hydration of the oxide layer by using a bond promoter coating as a bather between the oxide layer and the adhesive material.

An example adhesively bonded article includes a metallic substrate having an oxide layer thereon, a bond promoter coating on the oxide layer, an adhesive material on the bond promoter coating, and a component bonded to the metallic substrate by way of the adhesive material.

BRIEF DESCRIPTION OF THE DRAWINGS

The various features and advantages of the disclosed examples will become apparent to those skilled in the art from the following detailed description. The drawings that accompany the detailed description can be briefly described as follows.

DETAILED DESCRIPTION OF THE PREFERRED EMBODIMENT

Figure 1:
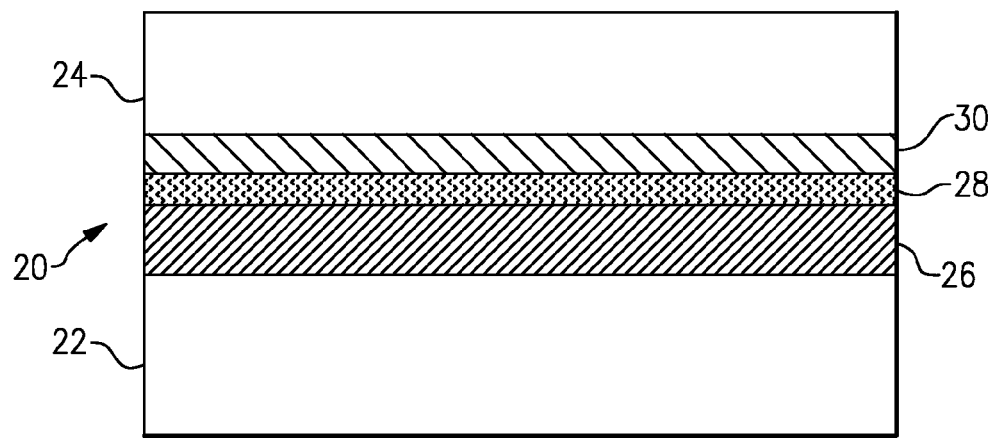
FIG. 1 illustrates an example adhesively bonded article.

FIG. 1 illustrates selected portions of an example adhesively bonded article 20. The adhesively bonded article 20 is not limited to any particular kind of article. In one example, the adhesively bonded article 20 may be an aircraft component that has a composite structure. The composite structure may be a honeycomb composite that includes two sheets and a honeycomb material bonded between the sheets.

In the illustrated example, the adhesively bonded article 20 includes a first sub-component 22 and a second sub-component 24 that is adhesively bonded to the first sub-component 22. In this regard the sub-components 22 and 24 are not limited to any particular kind. For example, the first sub-component 22 is a metallic substrate, such as a sheet of aluminum alloy. The aluminum alloy may be aluminum 2xxx, aluminum 5xxx, aluminum 3XXX, aluminum 6xxx, aluminum 7xxx, or other desirable aluminum alloy composition. Likewise, the second sub-component 24 is not limited to any particular type of sub-component. In the case of a honeycomb composite, the second sub-component 24 may be a honeycomb material that is bonded to the metallic substrate.

The first-subcomponent 22 includes an oxide layer 26 that is located at least on the surface of the first-subcomponent 22 that is to be bonded to the second sub-component 24. The oxide layer 26 may be an oxide of an element or elements that form the metallic substrate. For instance, the oxide layer 26 may be aluminum oxide, where the aluminum in the oxide is from the aluminum alloy of the first-subcomponent 22.

The adhesively bonded article 20 also includes a bond promoter coating 28, which is also considered to be a barrier coating, between the oxide layer 26 and an adhesive material 30. The bond promoter coating 28 may be a phosphonate conversion coating that functions to resist hydration of the oxide layer 26. As will be described below, the bond promoter coating 28 may be formed by treating the oxide layer 26 with a conversion coating solution. In this regard, the bond promoter coating 28 may be a derivative of the selected conversion coating solution. In some examples, the bond promoter coating 28 is a monolayer coating. The monolayer coating has a unitary molecular thickness and is generally 100 angstroms or less in thickness. The adhesive material 30 may be epoxy or other type of polymeric material that is suitable for bonding the first sub-component 22 and the second sub-component 24 together.

The oxide layer 26 can adsorb moisture from the adhesive material 30. The moisture can hydrate the oxide layer 26 and convert the oxide layer 26 (e.g., $Al_2O_3$) into less desirable types of oxides. For instance, aluminum oxide can hydrate to AlOOH (oxyhydroxide boehmite), $Al(OH)_3$ (bayerite), other oxide phases, or combinations thereof that exhibit weaker bonds with the underlying metallic substrate and thereby weaken the bond strength between the first sub-component 22 and the second sub-component 24. However, in the disclosed examples, the bond promoter coating 28 resists hydration of the oxide layer 26 to thereby provide a stronger and more durable bond between the first sub-component 22 and the second sub-component 24.

Figure 2:
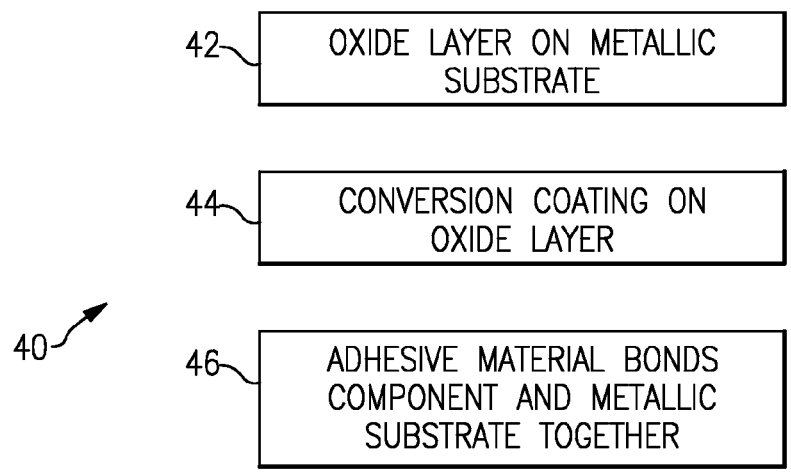
FIG. 2 illustrates an example method for adhesively bonding sub-components together to form an adhesively bonded article.

FIG. 2 illustrates an example method 40 for adhesively bonding a metallic substrate and a component together. For instance, the method 40 may be used to fabricate the adhesively bonded article 20 as described above. In the illustrated example, the method 40 includes steps 42, 44, and 46. Step 42 includes treating the metallic substrate to form the oxide layer 26 thereon. Step 44 includes treating the oxide layer 26 with a conversion coating solution to form the bond promoter coating 28 on the oxide layer 26, and step 46 includes depositing the adhesive material 30 on the bond promoter coating 28 to bond the metallic substrate (first sub-component 22) and the second sub-component 24 together.

Step 42 may include anodizing the metallic substrate to form the oxide layer 26. The anodizing may be conducted in a known manner using a suitable anodizing solution. For instance, the anodizing solution may be sulfuric acid, phosphoric acid, organic acid, boric acid, chromic acid or combinations thereof, but the anodizing solution is not limited to these examples. A few examples of organic acids include malic acid, sulphonated aromatic acids, sulfosalicylic acid, oxalic acid, tartaric acid, or combinations thereof. Alternatively, step 42 includes naturally forming the oxide layer 26 on the metallic substrate by exposing the metallic substrate to air. The oxidation may be accelerated with the application of heat and exposure to air or other oxidizing gas.

Step 44 includes treating the oxide layer 26 with a conversion coating solution to form the bond promoter coating 28 on the oxide layer 26. The type of conversion coating solution that a user selects may depend upon the type of bond promoter coating 28 that the user desires to form. For example, the conversion coating solution may include trivalent chromium and phosphonic acid. The phosphonic acid may be nitrilotris (methyelene) triphosphonic acid. Additionally, the parameters of the conversion coating process, such as the composition of the conversion coating solution and the treatment time may be controlled in a known manner to form the bond promoter coating 28 as a monolayer bather coating on the oxide layer 26. In this regard, the composition of the monolayer bather coating depends upon the composition of the conversion coating solution. For the above phosphonic acid conversion coating solution, the monolayer bather coating is a phosphonate monolayer and functions as described above to resist or limit hydration of the underlying oxide layer 26. The bond promoter coating 28 thereby functions to decrease or reduce the rate of water diffusion from the adhesive material 30 into the oxide layer 26.

Step 46 may include depositing the adhesive material 30 onto the bond promoter coating 28, the second sub-component 24, or both to bond the first sub-component 22 and the second sub-component 24 together. In this regard, the depositing of the adhesive material may include a known technique, such as spraying, painting, depositing by syringe, or other known technique. Depending on the type of adhesive material 30 that a user selects, an additional step of curing the adhesive may follow step 46. Given this description, one of ordinary skill in the art will recognize other steps that may be used in combination with the described method 40 to suit their particular needs, either prior to, in between, or subsequent to the steps 42, 44, and 46.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A method for adhesively bonding a metallic substrate and a component together, the method comprising:
   treating the metallic substrate to form an oxide layer thereon;
   treating the oxide layer with a conversion coating solution that includes phosphonic acid and trivalent chromium to form a phosphonate monolayer bond promoter coating on the oxide layer; and
   depositing an adhesive material on the phosphonate monolayer bond promoter coating to bond the component and the metallic substrate together.

2. The method as recited in claim 1, wherein the treating of the metallic substrate includes anodizing.

3. The method as recited in claim 2, wherein the anodizing includes using a solution selected from a group consisting of sulfuric acid, phosphoric acid, organic acid, boric acid, chromic acid, and combinations thereof.

4. The method as recited in claim 1, wherein the conversion coating solution includes nitrilotris (methyelene) triphosphonic acid.

5. The method as recited in claim 1, wherein the adhesive material is epoxy.

6. A method for inhibiting hydration of an adhesive joint, the method comprising:
   in an adhesively bonded article having a metallic substrate, an oxide layer on the metallic substrate, and an adhesive material joining a component and the metallic substrate together, resisting hydration of the oxide layer by using a phosphonate monolayer bond promoter coating as a barrier between the oxide layer and the adhesive material.

7. The method as recited in claim 6, including limiting diffusion movement of water from the adhesive material to the oxide layer using the bond promoter coating.

8. The method as recited in claim 6, wherein the bond promoter coating_is a phosphonate monolayer coating.

9. The method as recited in claim 8, wherein the phosphonate monolayer coating is a conversion coating.

10. The method as recited in claim 6, wherein the oxide layer is aluminum oxide, and the resisting of hydration of the oxide layer includes resisting conversion of the aluminum oxide into oxyhydroxide boehmite, bayerite, or combinations thereof.

11. The method as recited in claim 1, wherein the component is a honeycomb.

12. The method as recited in claim 11, wherein the metallic substrate is an aluminum alloy sheet.

* * * * *